United States Patent [19]

Fonda

[11] 4,390,565

[45] Jun. 28, 1983

[54] PHOTOCURABLE COMPOSITIONS FOR USE AS CERAMIC INK VEHICLES

[75] Inventor: James B. Fonda, Erie, Pa.

[73] Assignee: Lord Corporation, Erie, Pa.

[21] Appl. No.: 411,753

[22] Filed: Aug. 26, 1982

[51] Int. Cl.$^3$ .............................................. B05D 3/06
[52] U.S. Cl. ................... 427/44; 204/159.19; 427/54.1; 427/226; 427/376.2; 430/330
[58] Field of Search ............ 427/44, 54.1, 226, 376.2; 430/29, 321, 330; 204/159.19

[56] References Cited

U.S. PATENT DOCUMENTS

| | | | |
|---|---|---|---|
| 3,474,718 | 10/1969 | Guthri et al. | 430/330 |
| 3,982,941 | 9/1976 | Inskip | 427/96 |
| 4,020,191 | 4/1977 | Nagashiro et al. | 427/54.1 |
| 4,306,012 | 12/1981 | Scheve | 430/330 |

Primary Examiner—John H. Newsome
Attorney, Agent, or Firm—John A. Gazewood

[57] ABSTRACT

A radiation-curable ceramic ink composition comprising:
(a) from 2 to 30 percent by weight of at least one acrylated polycaprolactone diol polyurethane having a molecular weight in the range from 600 to 3500;
(b) from 2 to 40 percent by weight of a reactive diluent system comprising at least one addition-polymerizable acrylic monomer which is copolymerizable with said acrylated polycaprolactone diol polyurethane;
(c) from 60 to 90 percent by weight of at least one ceramic frit.

10 Claims, No Drawings

PHOTOCURABLE COMPOSITIONS FOR USE AS CERAMIC INK VEHICLES

FIELD OF THE INVENTION

This invention relates to radiation-curable compositions of matter. More particularly, the invention relates to radiation-curable binder compositions for use in the preparation and use of ceramic inks.

Ceramic ink compositions are well-known compositions which are utilized in diverse applications, such as automotive glass edge trim, decorative dinnerware, decorative logos for drinking glasses, ash trays and other glassware, conductive inks for window defrosters, ceramic capacitors and resistors, and the like.

Current commercial ceramic ink compositions comprise a vehicle consisting of wax and one or more low molecular weight thermoplastic polymer or other low melting solid material into which is incorporated from 60 to 90 percent by weight, based on ink composition, of ceramic frits. Such frits are typically high temperature-stable inorganic compounds in specially designed glasses, oftentimes being heavy metal oxides, such as ferric oxides, titanium dioxide, chromium oxide or zinc oxide. The inks are prepared by blending the ceramic frits into the vehicle to provide a smooth, homogeneous, workable composition. The inks are then screen printed onto heat resistant substrates and fired at temperatures in the range from 525° to 825° C. During the firing step, the vehicle is burned-off and the frit is fused to result in a smooth coating which becomes an integral part of the substrate or at least adheres well to the substrate.

In applying the inks, the use of heat or solvents or a combination of heat and solvents is generally necessary to provide the ink with a suitable viscosity and both the printing screens and the substrates must be heated prior to the printing operation. To overcome these objections, Scheve, U.S.A. Pat. No. 4,306,012, suggests the use of radiation-curable resins as binder resins for ceramic ink vehicles. Scheve broadly discloses the use of ethylenically unsaturated resins which are derived from hydroxyl-terminated polyesters, polyethers or polyester-polyethers, and which preferably have molecular weights in the range from 15000 to 80000. Notwithstanding Scheve, there remains a need for ceramic ink compositions which can be applied at room temperature to heat resistant substrates and fired in a conventional manner.

In accordance with the present invention, there are provided radiation-curable ceramic ink compositions which can be applied to heat resistant substrates at room temperature, are curable by exposure to ionizing radiation or actinic radiation, and burn-off at conventional conditions to provide a smooth coating which is at least well adhered to the heat resistant substrate. After curing the compositions, the coated substrates can be stored indefinitely or otherwise handled, e.g., cut, trimmed, washed or brushed, prior to being fired. A particularly advantageous benefit of the ink vehicles of the invention is the clean burn-off with little, if any, ash and other residues being formed.

More particularly, the ceramic ink compositions of the invention comprise:

(a) from 2 to 30, preferably 2 to 25, percent by weight of at least one acrylated polycaprolactone diol polyurethane;

(b) from 5 to 40, preferably 7 to 30, percent by weight of a reactive diluent system comprising at least one acrylic monomer which is copolymerizable with said acrylated polyurethane; and (c) from 60 to 90 percent by weight of at least one ceramic frit. It has been found that up to 12 percent by weight of at least one acrylic non-polycaprolactone diol polyurethane can be admixed into the ink vehicle prior to incorporation of the frits without significant negative effects; however, it is important that the acrylated polycaprolactone diol polyurethane make-up at least 60 weight percent of the polyurethane component. Other conventional additives, such as flow control agents, stabilizers, polymerization inhibitors, and the like, can be added to the ink compositions of this invention, when required.

The acrylated polycaprolactone diol polyurethane, which is an essential component of the ceramic ink compositions of this invention comprise the reaction product of (a) at least one organic isocyanate compound having two reactive isocyanate groups;

(b) at least one polycaprolactone diol; and (c) at least one addition-polymerizable monohydroxy acrylic monomer;

there being present an excess of isocyanate compound with respect to the hydroxyl groups of said polycaprolactone diol; with the monohydroxy acrylic monomer being present in an amount sufficient to provide at least one molar equivalent of hydroxy functionality with respect to isocyanate reactivity.

The isocyanate compounds which can be employed in forming the acrylated polycaprolactone diol polyurethane oligomers in accordance with the invention can be any organic isocyanate compound having two free isocyanate groups. Included within the purview of suitable polyisocyanates are aliphatic, cycloaliphatic and aromatic polyisocyanates, as these terms are generally interpreted in the art. Thus, it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 3,3'-bitolylene-4,4'-diisocyanate, 1,4-cyclohexylene dimethylene diisocyanate, xylylene-1,4-diisocyanate, xylylene-1,3-diisocyanate, cyclohexyl-1,4-diisocyanato, 4,4'-methylene-bis(cyclohexyl isocyanate), 3,3'-dimethyldiphenylmethane-4,4'-diisocyanate, isophorone diisocyanate, and the like. Aliphatic and cycloaliphatic diisocyanate compounds are currently preferred, with isophorone diisocyanate and 4,4'-methylene-bis(cyclohexyl isocyanate) being especially preferred.

The polycaprolactone diols are commercially available, e.g., from Union Carbide Corporation, in molecular weights in the range from 500 to 3000, with such diols or blends thereof having a molecular weight in the range of 750 to 1000 being currently preferred.

Addition-polymerizable monohydroxy acrylic monomers which are suitable for use in forming the acrylated polycaprolactone diol polyurethanes of this invention can be any monohydroxy acrylic compound which has been used to introduce a polymerizable acrylic moiety into a molecule via reaction between a hydroxyl group and a reactive isocyanate group. Illustrative of suitable monohydroxy acrylic compounds are 2-hydroxyethyl acrylate, 2-hydroxypropyl acrylate, diethylene glycol monoacrylate and the like. The amount of such compounds will be sufficient to provide at least one molar equivalent of hydroxyl group with respect to isocyanate functionality, and preferably is sufficient to afford an active hydrogen group:NCO ratio, with respect to the amount of total free hydroxyl functions, of at least 1:1, with a small excess, 10 mol percent or less, being especially preferred.

The acrylated polycaprolactone diol polyurethane oligomers can be prepared by any of several known reaction routes, including, (1), simultaneous reactions of diisocyanate, polycaprolactone diol and monohydroxy acrylic monomer; and, (2), reaction of diisocyanate and monohydroxy acrylic monomer to form an acrylated isocyanate-functional compound which is then reacted with the polycaprolactone diol, the amount of acrylated isocyanate being sufficient to consume all hydroxyl groups of the polycaprolactone diol, with any excess isocyanate moieties being preferentially reacted with additional monohydroxy acrylic monomer. The preferred method of forming the oligomers is a, (3), two-step method comprising, (I), reacting the polycaprolactone diol with excess diisocyanate to form an isocyanate-functional urethane prepolymer, and, (II), reacting the thus-formed urethane prepolymer with sufficient monohydroxy acrylic monomer to form an acrylated polyurethane which has substantially no free reactive isocyanate functionality. In forming the acrylated polycaprolactone polyurethane oligomers of this invention, there will be employed at least a slight excess of diisocyanate with respect to the hydroxyl functionality of the polycaprolactone diol. Preferably, the amount of polyisocyanate will be sufficient to provide an NCO-:OH ratio, with respect to the polycaprolactone diol, of at least 2.1:1, preferably in the range from 2.3:1. The oligomers of this invention can be prepared neat, as can the intermediates in the multi-step processes, but are preferably prepared in the presence of a diluent phase which is copolymerizable with the acrylated urethane oligomer but is otherwise inert during the particular process of preparing the oligomers. Because the various methods of preparing unsaturated urethane resins are well-known, for example, see U.S. Pat. No. 3,700,643, it is considered that any detailed discussion of such methods is unnecessary.

As noted, the ink compositions of this invention can optionally contain up to 10 percent by weight, based on total weight of the ink of an acrylated polyurethane which is not derived from a polycaprolactone diol. Such acrylated polyurethanes are obtained from the reaction of polyester diols, polyether diols and polyesterether diols, diisocyanate compounds and monohydroxy acrylic monomers, employing the same reaction procedures as used to form the acrylated polycaprolactone polyurethane oligomers. See U.S.A. Pat. Nos. 4,113,723 and 3,700,643. The amount of such optional acrylated polyurethane oligomers should be not more than 40 percent by weight, based on total weight of acrylated oligomers.

The acrylated oligomers which are employed in the ceramic inks of this invention, whether or not derived from polycaprolactone diol, are characterized by a molecular weight in the range from 600 to 3500, with oligomers having molecular weights in the range from 1500 to 3000 being preferred. Depending on the molecular weight of the diol employed in forming the acrylated polyurethane, it can be advantageous to employ low molecular weight diol chain extenders, such as ethylene glycol, 1,4-butane diol and the like. The use of chain extenders is well known in urethane chemistry.

Reactive diluent systems for use with radiation-curable compositions of matter are well known. Broadly, reactive diluent systems which are suitable for use in the practice of this invention comprise at least one acrylic monomer which is copolymerizable with the acrylated urethane oligomers of this invention, when exposed to ionizing irradiation, such as electron beam, or actinic irradiation; such as ultraviolet light. The acrylic monomers can be monofunctional or polyfunctional, with respect to polymerizable acrylic moieties, with diacrylate compounds being currently preferred. In cases where diacrylates are mixed with monoacrylates and/or compounds having three or more acrylic groups, it is preferred that at least 25 percent by weight, based on total weight of reactive diluent, for the reactive diluent consist of diacrylate monomers. Generally, the reactive diluent system will comprise from 50 to 95, preferably 60 to 90, percent by weight, based on total weight of acrylated oligomer and reactive diluent. Representative acrylic monomers which can be employed to form reactive diluent systems are hexyl acrylate, cyclohexyl acrylate, 2-ethylhexyl acrylate, nonyl acrylate, stearyl acrylate, 2-phenoxy acrylate, 2-methoxyethyl acrylate, 2-(N,N-diethylamino)-ethyl acrylate, neopentyl glycol diacrylate, ethylene glycol diacrylate, hexylene glycol diacrylate, diethylene glycol diacrylate, tetraethylene glycol diacrylate, pentaerythritol di-, tri-, or tetra-acrylate and trimethylolpropane triacrylate. Polymerizable non-acrylic monomers such as styrene, acrylonitrile, methylacrylonitrile, and vinyl pyrrolidone can also be employed as reactive diluents in combination with one or more acrylic monomers. However, methacrylic monomers are not used in the ink compositions of this invention, even though such monomers have been previously used as reactive diluents for other applications.

Ceramic frits employed in the ceramic inks of the invention are known commercial products comprising high temperature-stable inorganic compounds in specially designed glasses. Typically inorganic compounds include ferric oxides, titanium dioxide, chromium oxide, zinc oxide, magnesium dioxide, alumina, cobalt oxide, cadmium oxide, praseodymium silicate and zirconium silicate.

The formulated ceramic ink compositions of the invention are readily cured by exposure to an appropriate source of irradiation, such as ionizing irradiation or actinic irradiation. Polymerization initiators are not required when cure is effected by exposure to ionizing irradiation. A photoinitiator system is required when cure is effected by exposure to actinic irradiation, such as ultraviolet light. A particularly effective photoinitiating system comprises benzophenone in combination with one or more Michler ketones (Michler's ethyl ketone is preferred) or one or more thioxanthones (dodecyl-, isopropyl, chloro-). The use of these photoinitiation systems can provide excellent cure speeds, e.g., approaching 80 fpm on 1.0–1.5 mil thickness films using a single 300 watt Fusion "H" lamp. Benzophenone is present in an amount in the range from 0.1 to 7.0, preferably 0.5 to 4.0, percent by weight, based on total weight of ink, with the auxiliary component, i.e., the Michler ketone or thioxanthone, being present in an amount corresponding to from 10 to 80, preferably 15 to 75, percent of the amount of benzophenone.

In forming the ink compositions of this invention, the acrylated oligomers, which normally are prepared in the reactive diluent system at a resin solids content of 50 to 90 percent are diluted with sufficient additional diluent to provide a resin content in the range from 2 to 30, preferably 2 to 25, percent by weight, based on total weight of the final ink composition. All components of the ink vehicle are blended in employing conventional mixing techniques, prior to incorporating the ceramic frits into the vehicle.

The ceramic ink compositions of the invention are applied to heat resistant substrates, such as glass, metal or ceramic pieces, by conventional techniques, such as by screen printing. The coating is cured by exposure to ionizing radiation or actinic radiation for a time sufficient to at least cure the coating to a state in which the substrate can be handled without damage to the applied design. The firing step is carried out at conventional temperatures (500° to 900° C.) in order to fuse the ceramic frits to the substrate. The compositions of the invention flow out evenly to form a smooth coating which adheres well to glass, metal and ceramic substrates. The cured vehicle burns-off cleanly, leaving substantially no undesirable ash or other residue.

The invention is illustrated in greater detail by the following examples, in which all amounts are in parts by weight unless otherwise noted.

EXAMPLE I

An acrylated polycaprolactone polyurethane resin was prepared by reacting 7546 parts polycaprolactone diol (MW 837), 1199 parts isophorone diisocyante and 324 parts 1,4-butane diol in 1497 parts tetraethyleneglycol diacrylate. The resulting isocyanate-functional urethane prepolymer was reacted with 219 parts 2-hydroxyethyl acrylate to afford a fully-capped addition-polymerizable acrylated polycaprolactone polyurethane oligomer having a molecular weight ca., 2500, with substantially no free isocyanate activity. The reaction mixture was diluted with additional tetraethylene glycol diacrylate to afford a syrup of oligomer in reactive diluent at 50% resin solids. The resin was identified as APCU.

An acrylated polyether polyurethane was prepared by reacting 1 mol poly(tetramethylene oxide) diol (650) and 3 mols 4,4'-methylene-bis(cyclohexyl isocyanate) in 2-ethylhexyl acrylate inert reactive diluent. The resulting isocyanate-functional urethane prepolymer is reacted with 4.1 mols 2-hydroxyethyl acrylate to afford a fully-capped addition-polymerizable acrylated polyether polyurethane oligomer having a molecular weight ca. 1900 with substantially no free isocyanate functionality. The resin was identified as APEU-I.

An acrylated polyether polyurethane resin was prepared by reacting 1 mol poly(propylene oxide-ethylene oxide) diol (MW 1000) and 3 mols 4,4'-methylene-bis(-cyclohexyl isocyanate) in tetraethylene glycol diacrylate inert reactive diluent. The resulting isocyanate functional urethane oligomer was reacted with 4.1 mols 2-hydroxyethyl acrylate to afford a fully-capped addition-polymerizable acrylated polyether polyurethane oligomer having a molecular weight ca. 2250 with substantially no free isocyanate functionality. The resin was identified as APEU-II.

An acrylated polyether polyurethane was prepared by reacting 467 parts poly(tetramethylene oxide) diol (MW 1000), 289 parts poly(tetramethylene oxide) diol (MW 650), 324 parts 1,4-butane diol and 1199 parts isophorone diisocyanate in tetraethylene glycol diacrylate inert reactive diluent. The resulting isocyanate-functional urethane prepolymer was reacted with 219 parts 2-hydroxyethyl acrylate to afford a fully-capped addition-polymerizable acrylated polyether polyurethane having a molecular weight ca. 2500 with substantially no free isocyanate functionality. The resin was identified as APEU-III.

EXAMPLE II

Unpigmented clear ceramic ink vehicles were prepared according to the following formulations:

| Vehicle | II-A | II-B | II-C | II-D | II-E |
| --- | --- | --- | --- | --- | --- |
| APCU resin | 13.13 | 13.92 | — | — | — |
| APEU-I resin | — | 6.58 | — | — | — |
| APEU-II resin | — | — | 43.03 | — | — |
| APEU-III resin | — | — | — | 13.13 | — |
| Acrylated bisphenol A epoxy resin | — | — | — | — | 74.85 |
| Tetraethylene glycol diacrylate | 74.58 | 16.50 | 43.03 | 74.58 | 14.97 |
| 2-Ethylhexyl acrylate | — | 6.80 | — | — | — |
| Vinyl pyrrolidone | — | 10.09 | — | — | — |
| 1,4-Hexane diol diacrylate | — | 0.61 | — | — | — |
| Acrylic acid | — | 0.11 | — | — | — |
| Ethoxylated trimethylolpropane triacrylate | — | 1.06 | — | — | — |
| Trimethylolpropane triacrylate | — | 30.13 | — | — | — |
| Michler's ethyl ketone | — | 5.17 | 5.16 | — | — |
| Benzophenone | 7.72 | 7.75 | 7.77 | 7.72 | 6.88 |
| Isopropyl thioxanthone | 1.68 | — | — | 1.68 | 1.65 |
| 2-Hydroxy-2-methyl-1 phenyl-propan-1-one | 1.94 | — | — | 1.94 | — |

Each of the formulations was screen printed through 304 mesh screen onto glass panels. The thus-coated substrates were cured by exposure to ultraviolet light (2 Fusion "H" lamps) in air at a line speed of 40 feet per minute. The cured formulations were fired for 2 minutes at 620° C. After firing, the substrates were visually inspected for ash and residue, based on the following rating system: 0=no residue; 1=very light spotty powder; 2=light spotty powder; 3=heavier spotty powder; and 4=black ash. The results are reported in Table II.

TABLE II

Comparison of Residual Ash on Different Oligomer Types

| Vehicle | Rating of Residue after Firing |
| --- | --- |
| II-A | 1 |
| II-B | 2 |
| II-C | 3 |
| II-D | 3 |
| II-E | 4 |

The data clearly demonstrate the superiority of vehicles containing acrylated polycaprolactone diol polyurethanes.

EXAMPLE II

Unpigmented clear ceramic ink vehicles were prepared according to the following formulations:

| Vehicle | III-A | III-B | III-C |
|---|---|---|---|
| APCU resin | 43.7 | 26.26 | 13.13 |
| Tetraethylene glycol diacrylate | 43.7 | 61.45 | 74.3 |
| Benzophenone | 7.79 | 7.72 | 7.78 |
| Isopropylthioxanthone | 1.92 | 1.68 | 1.92 |
| 2-Hydroxy-2-methyl-1-phenyl-propan-1-one | 1.92 | 1.94 | 1.92 |
| % resin solids | 43.7 | 26.26 | 13.13 |

The vehicles were screen printed through 330 mesh screen onto glass substrates. The thus-coated substrates were cured by exposure to ultraviolet light (2 Fusion "H" lamps) in air at a line speed of 40 feet per minute. Thermal gravimetric analysis of the cured films gave the results reported in Table III.

TABLE III

Effect of Resin Solids on Burn-Off

| Vehicle | TGA, % Wt. Loss Temperature, °C. | | | | | | | |
|---|---|---|---|---|---|---|---|---|
| | 200° | 250° | 300° | 350° | 400° | 450° | 500° | 550° |
| III-A | 2 | 6 | 12 | 26 | 66 | 90 | 92 | 94 |
| III-B | 4 | 9 | 17 | 35 | 89 | 90 | 91 | 96 |
| III-C | 4 | 13 | 22 | 38 | 90 | 90 | 92 | 97 |

The data are self-explanatory.

EXAMPLE IV

Clear, unpigmented ink vehicles are prepared according to the following formulations:

| Vehicle | IV-A | IV-B | IV-C | IV-D |
|---|---|---|---|---|
| APEU-II resin | 43.7 | 26.26 | — | — |
| APCU resin | — | — | 43.7 | 26.26 |
| Tetraethylene glycol diacrylate | 43.7 | 61.45 | 43.7 | 26.26 |
| Isopropyl thioxanthone | 1.92 | 1.61 | 1.92 | 1.61 |
| 2-Hydroxy-2-methyl-1-phenyl-propan-1-one | 1.92 | 1.94 | 1.92 | 1.94 |
| Benzophenone | 7.79 | 7.72 | 7.79 | 7.72 |
| % resin solids | 43.7 | 26.62 | 43.7 | 26.62 |

The formulations were screen printed through 330 mesh screen onto glass substrates. The thus-coated substrates were cured by exposure to ultraviolet light (2 Fusion "H" lamps) in air at a line speed of 40 feet per minute. Thermal gravimetric analysis of the cured films gave the results reported in Table IV.

TABLE IV

Comparative Burn-Off of Acrylated Polycaprolactone Diol Polyurethane and Acrylated Polyether Polyurethane

| Vehicle | TGA, % Wt. Loss @ °C. | | | | | | | |
|---|---|---|---|---|---|---|---|---|
| | 200 | 250 | 300 | 350 | 400 | 450 | 500 | 550 |
| IV-A | 3 | 14 | 22 | 44 | 88 | 90 | 91 | 94 |
| IV-B | 3 | 14 | 22 | 42 | 90 | 90 | 92 | 95 |
| IV-C | 2 | 6 | 12 | 26 | 66 | 90 | 92 | 94 |
| IV-D | 4 | 9 | 17 | 35 | 89 | 90 | 91 | 96 |

The data demonstrate essentially equivalent burn-off characteristics of all formulations. However, as demonstrated by the data of Example II, firing of ink vehicles containing acrylated polycaprolactone diol polyurethane oligomers results in substantially less residues.

EXAMPLE V

Ceramic ink compositions were prepared by milling black, gray and white ceramic frits into each of vehicles II-A and II-B of Example II. The frit was compounded into the vehicles at a weight ratio of 3.5:1. The ink compositions were as follows:

| Ceramic Ink | V-A | V-B | V-C | V-D | V-E | V-F | V-G | V-H | V-I | V-J |
|---|---|---|---|---|---|---|---|---|---|---|
| Vehicle II-A | 100 | — | 100 | — | 100 | — | 100 | — | 100 | — |
| Vehicle II-B | — | 100 | — | 100 | — | 100 | — | 100 | — | 100 |
| Black frit | 350 | 350 | 350 | 350 | — | — | — | — | — | — |
| Gray frit | — | — | — | — | 350 | 350 | 350 | 350 | — | — |
| White frit | — | — | — | — | — | — | — | — | 350 | 350 |
| Dimethylaminoethanol | — | — | 3 | 3 | — | — | 1 | 1 | — | — |

The ceramic inks are screen printed onto automotive glass through a 304 mesh screen at a 1.0–1.5 mils film thickness. The inks were cured by exposure to ultraviolet light (Fusion H lamps) at varying conditions. The cured inks were fired and the firing results were determined visually, with the result being reported in Table V.

TABLE V

| Ceramic Ink | Cure Conditions[a] Line Speed, fpm/# of Lamps | | | | Firing °C./min. | Firing Results at Cure Conditions[b] | | | |
|---|---|---|---|---|---|---|---|---|---|
| | 80/1 | 60/1 | 40/1 | 40/2 | | 80/1 | 60/1 | 40/1 | 40/2 |
| V-A | C | C | C | C | 732/3½ | G | G | G | G |
| V-B | N | N | N | C | 732/3½ | — | — | — | T |
| V-C | C | C | C | C | 732/3½ | G | G | G | G |
| V-D | N | N | C | C | 732/3½ | — | — | G | G |
| V-E | C | C | C | C | 677/4 | G | G | G | G |
| V-F | N | N | N | C | 677/4 | — | — | — | B |
| V-G | C | C | C | C | 677/4 | G | G | G | G |
| V-H | — | — | — | C | 677/4 | — | — | — | G |
| V-I | C | C | C | C | 427/3½ & 677/4 | G | G | T | T |
| V-J | — | — | — | C | 427/3½ | — | — | — | G |

TABLE V-continued

| Ceramic Ink | Cure Conditions[a] Line Speed, fpm/# of Lamps | | | | Firing | Firing Results at Cure Conditions[b] | | | |
|---|---|---|---|---|---|---|---|---|---|
| | 80/1 | 60/1 | 40/1 | 40/2 | °C./min. | 80/1 | 60/1 | 40/1 | 40/2 |
| | | | | | & 677/4 | | | | |

[a] C = ink cured; N = ink did not cure.
[b] G = good coating; T — coating tore; B = coating not acceptable.

The data demonstrate the excellent results of ceramic inks prepared in accordance with this invention. The data also show that incorporating dimethylaminoethanol in amounts from 1 to 3 percent by weight, based on vehicle, is effective in improving the appearance of the fired frit. As a general rule, the amount of dimethylaminoethanol will be in the range of 0.5 to 5.0 percent by weight, based on weight of vehicle.

What is claimed is:

1. A radiation-curable ceramic ink composition comprising
   (a) from 2 to 30 percent by weight of at least one acrylated polycaprolactone diol polyurethane having a molecular weight in the range from 600 to 3500;
   (b) from 2 to 40 percent by weight of a reactive diluent system comprising at least one addition-polymerizable acrylic monomer which is copolymerizable with said acrylated polycaprolactone diol polyurethane;
   (c) from 60 to 90 percent by weight of at least one ceramic frit.

2. A ceramic ink composition according to claim 1 containing from 0.5 to 5 percent by weight, based on total weight of ink composition excluding the weight of ceramic frit, of dimethylaminoethanol.

3. A ceramic ink composition according to claim 1 containing an effective amount of a photoinitiation system comprising benzophenone in combination with, (i), at least one Michler ketone or, (ii), at least one thioxanthone.

4. A ceramic ink composition according to claim 3 containing from 0.5 to 5 percent by weight, based on total weight of ink composition excluding the weight of ceramic frit, of dimethylaminoethanol.

5. A ceramic ink composition according to claim 1 containing at least one acrylated non-polycaprolactone diol polyurethane.

6. A ceramic ink composition according to claim 5 containing from 0.5 to 5 percent by weight, based on total weight of ink composition excluding weight of ceramic frit, of dimethylaminoethanol.

7. A ceramic ink composition according to claim 5 containing an effective amount of a photoinitiator system comprising benzophenone in combination with, (i), at least one Michler ketone or, (ii), at least one thioxanthone.

8. A ceramic ink composition according to claim 7 containing from 0.5 to 5 percent by weight, based on total weight of ink composition excluding weight of ceramic frit, of dimethylaminoethanol.

9. A method for producing a ceramic coating on a heat-resistant substrate comprising:
   (a) applying to said substrate a coating composition comprising
      (i) from 2 to 30 percent by weight of at least one acrylated polycaprolactone diol polyurethane having a molecular weight in the range from 600 to 3500;
      (ii) from 2 to 40 percent by weight of a reactive diluent system comprising at least one addition-polymerizable acrylic monomer which is copolymerizable with said acrylated polycaprolactone diol polyurethane; and
      (iii) from 60 to 90 percent by weight of at least one ceramic frit;
   (b) exposing said coated substrate to irradiation for a time sufficient to harden said coating; and
   (c) heating said coated substrate for a time and a temperature sufficient to pyrolize said coating and fuse said ceramic frit, to leave a substrate covered only with fused ceramic frit.

10. In the process of applying a ceramic coating to a heat-resistant substrate comprising the steps of:
    (a) applying a printing medium to a heat-resistant substrate, said printing medium comprising at least one ceramic frit and a fluid vehicle therefor;
    (b) curing said printing medium after it has been applied to said substrate by exposure to a source of irradiation selected from the group consisting of ionizing radiation and actinic radiation; and
    (c) firing said coated substrate at a temperature and for a time sufficient to burn-off the vehicle and fuse the ceramic frit to the substrate;
    the improvement wherein the printing medium is a radiation-curable ceramic ink composition comprising:
    (a) from 2 to 30 percent by weight of at least one acrylated polycaprolactone diol polyurethane having a molecular weight in the range from 600 to 3500;
    (b) from 2 to 40 percent by weight of a reactive diluent system comprising at least one addition-polymerizable acrylic monomer which is copolymerizable with said acrylated polycaprolactone diol polyurethane; and
    (c) from 60 to 90 percent by weight of at least one ceramic frit.

* * * * *